Feb. 23, 1932.  C. R. SMITH  1,846,368
METHOD OF MAKING PIPE
Filed May 13, 1929   2 Sheets-Sheet 1
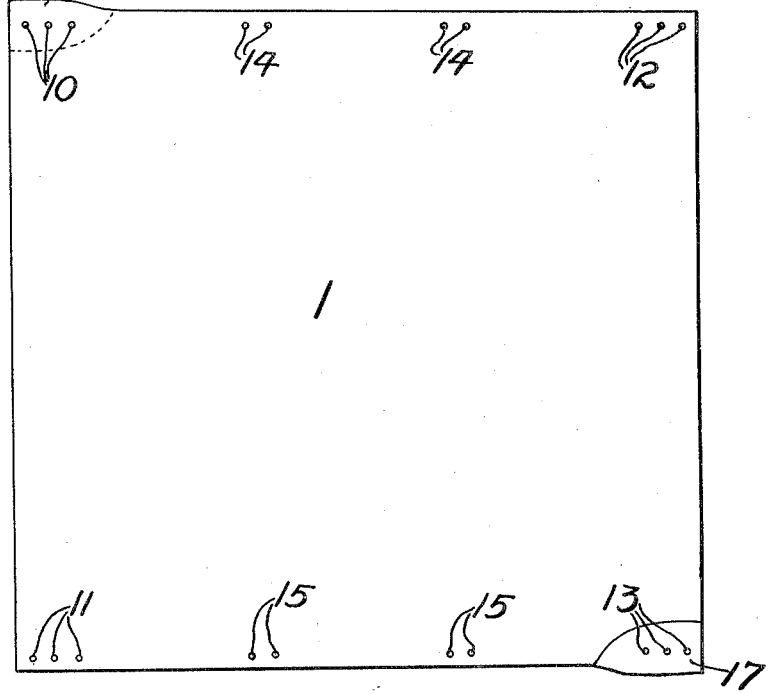
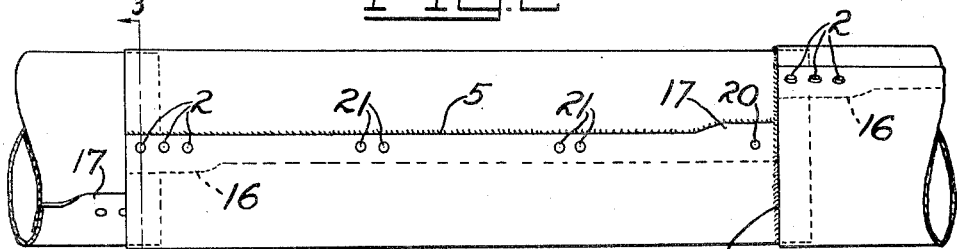
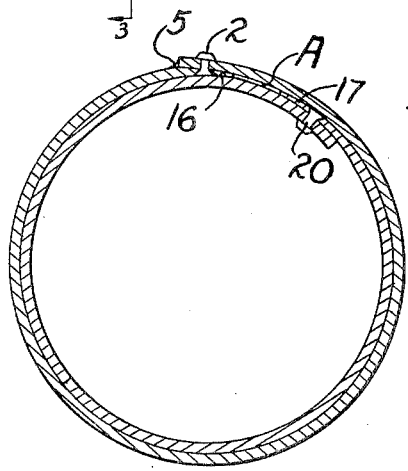
Inventor
*Cecil R. Smith*
By *Reynolds & Reynolds*
Attorneys

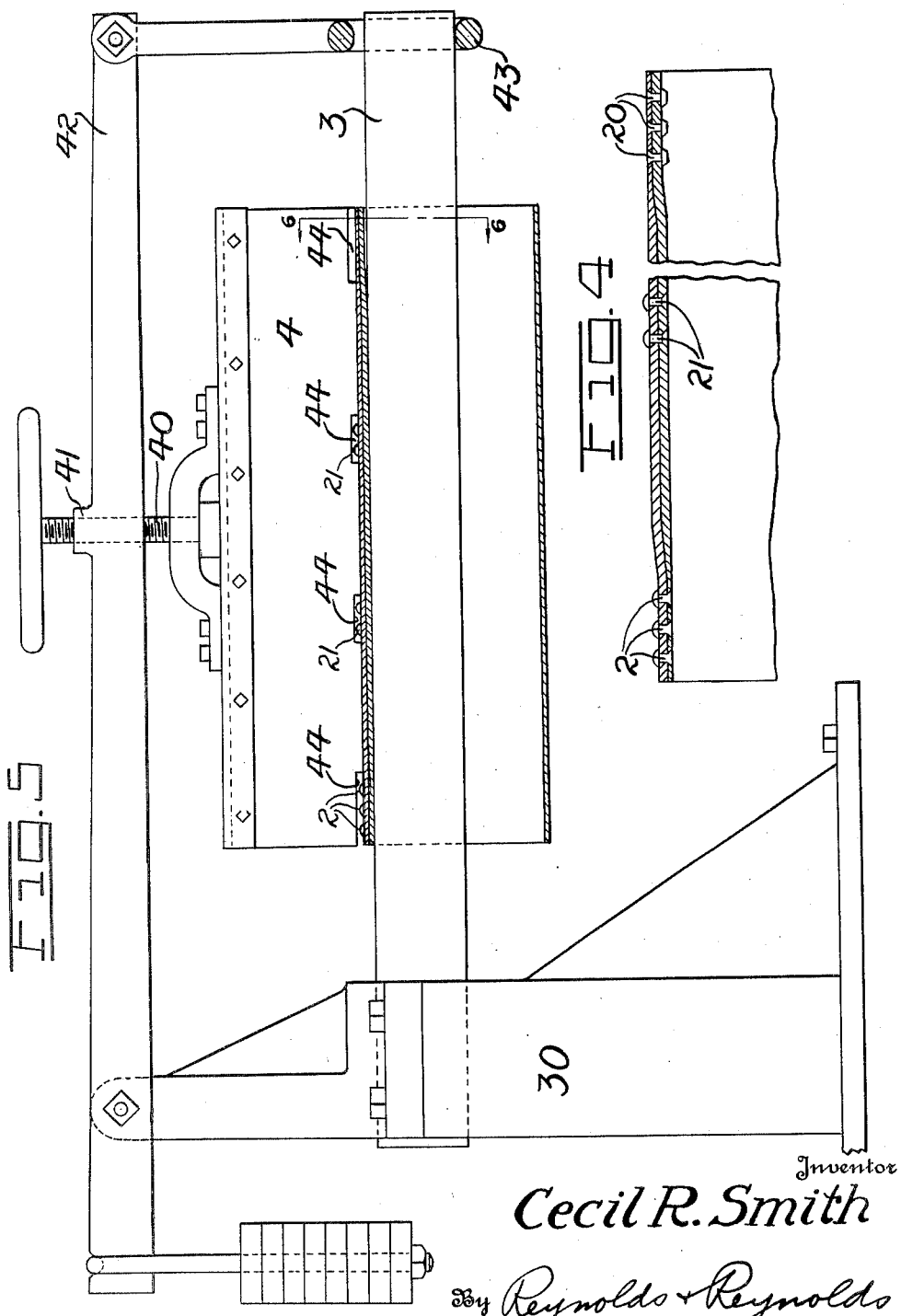

Patented Feb. 23, 1932

1,846,368

UNITED STATES PATENT OFFICE

CECIL R. SMITH, OF SEATTLE, WASHINGTON

METHOD OF MAKING PIPE

Application filed May 13, 1929. Serial No. 362,736.

My invention relates to the art of making pipe of sheet metal. In particular, it is directed to an improvement in what is known as slip-joint dimension pipe, that is to say, a pipe which is slightly tapered, so as to have a male and a female end, the male end exactly fitting within the female end of an adjoining pipe or pipe section.

Such pipe is commonly used in hydraulic operations, frequently such as are connected with mining. Because of the nature and extent of such operations, it is often necessary to take up sections of pipe and move them to new locations, and again to fit them together. It is also necessary to supply new or additional sections from time to time, and it is essential that in all such changes the various pipes or pipe sections will exactly fit all other sections of the same rated size. This requires extreme care in manufacture to make and keep the pipe always exactly the proper diameter at the ends.

With riveted seams, such as have commonly been employed in such pipe, the rivets will work and give, destroying the exact diametric relationship of the pipe. Further, riveted seams cannot with economy be made fully water tight. Not only is there leakage and wastage of water and of pressure through imperfect joints, but the presence of water leaking from such joints is a considerable hindrance to the progress of the operation itself.

The object of my invention, then, is twofold, first, to provide a method of making pipe of this character to exact dimension, and second, to make such a pipe which has water tight seams throughout, and seams which will not give to permit variations in the diametrical measurements. Of course, associated with these objects, it is my object to produce pipe, having these advantages, in a manner which is economical, and which will permit the pipe to be manufactured at a price which will be competitive with the ordinary riveted pipe.

My invention comprises the novel method of making pipe of the character indicated, and the novel steps which constitute the same will be particularly described in the present specification, and defined by the claims which terminate the same.

In the accompanying drawings I have shown the several steps in my method, and have shown a form of apparatus by means of which the same can be practiced.

Figure 1 illustrates the blank from which a section of pipe is to be constructed.

Figure 2 shows a completed pipe section, permanently joined to the end of another section, and having a third section slipped into one end thereof.

Figure 3 represents a transverse section on the line 3—3 of Figure 2.

Figure 4 is a longitudinal section along the seam of such a pipe section.

Figure 5 is an elevation of the apparatus by means of which such pipe may be constructed, the pipe itself being illustrated in section.

Figure 6 is a section on line 6—6 of Figure 5.

Such pipe as this is ordinarily tapering, so that one end is just enough smaller than the other end that it may slip easily within a like large or female end of an adjoining section, and fit tightly therein. This requires careful construction of the pipe to maintain the exact relationship between the two edges of a sheet which is to be rolled into cylindrical or pipe shape. It has not been found practicable to proceed immediately with the manufacture of the pipe without preliminarily or temporarily holding the edges in this exact relationship. Accordingly, before the pipe is rolled into cylindrical form, opposite edges of a sheet, represented by 1, are punched at intervals to provide rivet holes, represented 10, 11, 12, 13, 14, and 15. The rivet holes 10 and 12, as may be seen in Figure 1, are disposed at opposite ends of one of the edges which is to be overlapped over or under the opposite edge, and the corresponding holes are 11 and 13, respectively. The holes 14 and 15 are in corresponding locations at opposite edges, so that they may be brought into registry, but are spaced at intervals along their respective edges. In other words, there is no continuous line of rivet holes, but only enough are provided to hold the pipe, when rolled, temporarily or preliminarily in the exact diametrical and circumferential relationship desired at that particular point in the length of the pipe.

Accordingly, the next step is to form or roll the sheet 1 into cylindrical form, overlapping the opposite edges, bringing the respective holes 10 and 11, 12 and 13, 14 and 15, into registry, and holding them in registry by inserting rivets, bolts, or like securing means. These are best illustrated as the rivets 2 passing through the holes 10 and 11, the rivets 20 passing through the holes 12 and 13, and the rivets 21 passing through the registering holes 14 and 15. Any temporary securing means, sufficiently exact, may be employed in lieu of rivets. To permit the pipe to fit smoothly, one section within the next, it is desirable that the rivets 2, at the female end, have their rounded or button heads on the outside, and that they be provided with countersunk heads on the inside, lying flush with the interior circumference of the pipe. Similarly, the rivets 20 at the male end should be countersunk on the outside and flush with the outside circumference of the pipe, leaving the button heads on the inside of the pipe. It is immaterial whether the rivets 21 have the upset head on the inside or the outside, but for convenience in manufacture, and to keep the interior of the pipe as free from obstruction as possible, it is customary to form the button heads on the outside.

These rivet holes, and the rivets, may be so proportioned and secured together that they will maintain the exact diametrical relationship desired when the holes have been properly spaced in laying out the sheets.

The next step is to complete the pipe by permanently securing the opposite edges, which are now overlapped, together. As it makes the most secure, substantial, and perfect joint, I prefer that a welding process be employed. However, it is not convenient or economical to employ welding unless the surfaces to be welded are in close association or contact throughout. Owing to the natural resistance of the metal to bending and deformation, the edges between the spaced rivets 21, and between these rivets 2 and 20, will bulge, and will not lie closely together. To remedy this, and to provide a convenient means whereby welding may be carried out economically, I provide the device shown in Figure 5, or some equivalent means, for pressing together these overlapped edges. Thus, a heavy mandrel 3 is supported in a standard 30, and forms in effect a support for the pipe, and one jaw of a vise. The other jaw of the vise is composed of the plate or rib 4, which is brought down with edge contact upon the top layer of the overlapped seam, and, the pipe being supported on the mandrel 3, its edges are compressed between this mandrel and the plate 4, and the edges are pressed into close relationship.

It will be noted that the plate 4 is controlled by means of a screw 40, threaded in a nut 41, formed in or secured upon a counterweighted arm 42, the swinging end of which has secured thereto a ring 43, which encircles the free end of the mandrel 3, thus providing a resistance against which the screw 40 may act. The counterweight holds the arm upraised except when held down by the ring 43.

It may be noted, also, that the working edge of the plate 4 is cut out, as indicated at 44, at such intervals along its edge as will correspond to the spacing of the rivets in the pipe. It is not necessary to cut out the mandrel to accommodate the internally projecting heads of the rivets 20, since these are sufficiently to one side of the clamping plate 4, and the curvature of the mandrel is so much greater than the pipe, that there is no contact between these rivet heads and the mandrel.

Now, through the employment of some such a device as that just described, the overlapped edges of the plate 1 are pressed together, and while in this condition these overlapped edges may be welded together, as is indicated at 5 in Figures 2 and 3. This weld runs substantially the length of the pipe, but being continuous and in one straight line can be effected in a minimum of time, and consequently at a minimum expense.

The pipe is now completed and ready for use, unless it may be found necessary to grind off a little of the weld at the extreme end of the pipe, at least the male end thereof, so as to fit smoothly within the adjoining pipe or section. Similarly, while such sections may, within practical limits, be made as long as necessary, it is customary to make them up in standard length sections, shorter than the sections of pipe required on the ground, and thus five—or six—foot sections of pipe may be made, and these fitted together and joined permanently, as by welding, as indicated at 50 in Figure 2. It is not intended, however, that the pipe, when in use in the field, be joined in any permanent manner, or in any manner at all, other than by slipping the end of one into the end of another, and such a slip joint has been indicated at the left hand end of Figure 2.

Such sheets of metal, if of any considerable thickness, are ordinarily ground down or scarfed to a thin edge, so that when this scarfed edge is overlapped over the opposite edge there will be formed a nearly circular circumference, either on the inside or the outside, so as to fit smoothly, and without perceptible break, into the adjoining pipe section. This scarfing has been indicated at 16 and 17 in Figure 1. At 16 the scarfing is on the inside, since this is to be the female end of the section, and at 17 it is on the outside.

The pipe section shown in the center in Figure 2 is made up from such a sheet as Figure 1 placed in the same relative position, and illustrates the scarfed section 17 on the outside fitting within an adjoining pipe section, which has the scarfing 16 on the inside. Figure 3 illustrates how two such sections may be fitted together, and how a practically tight joint may be formed, especially if the narrow space A between the edges of the two plates be filled with a viscous material or a filler, such as cheese cloth impregnated with tar or asphalt.

Such pipe will easily carry pressures of 150 pounds to the square inch, or better, without appreciable leakage, yet may be easily taken apart and fitted together again whenever required, and sections made up to this dimension will, it is known in advance, fit perfectly into sections previously made. The seams are tight throughout their length, and the welds will last as long as the pipe itself. The welding operation is comparable in cost to the riveting operation, and considering the longer life and usefulness of a welded pipe, it has been found cheaper than the ordinary riveted pipe.

What I claim as my invention is:

1. The method of making sheet metal pipe of the character described which consists in shaping the sheet cylindrically, temporarily securing opposite edges together in exact diametrical relationship at points spaced therealong, bringing the metal of the two edges closely together, between said points of temporary securement, and finally welding such edges together throughout their length.

2. The method of making sheet metal pipe of the character described which consists in shaping the sheet cylindrically to leave opposite edges overlapping, the inside corner at the female end and the outside corner at the male end having been previously scarfed down to an edge, temporarily securing the overlapped edges together at spaced points, to maintain exact diametrical relationship throughout while handling the partly finished pipe, and finally welding together the overlapped edges throughout their length.

3. The method of making sheet metal pipe of the character described, which consists in punching complemental rivet holes at points spaced along opposite edges, at exact circumferential distances, shaping the pipe to overlap such edges and to bring corresponding rivet holes into registry, securing rivets therein to preliminarily maintain the pipe of an exact predetermined diameter, and finally welding the length of one of the overlapped edges, to the other edge.

4. The method of making slip-joint sheet metal pipe which consists in punching a plurality of accurately spaced pairs of rivet holes, the holes of each pair being located at opposite side edges of the blank, and the pairs being spaced lengthwise of the blank, shaping the blank sheet cylindrically to bring the holes of each pair into registry, securing rivets in such registering holes to prefix the opposite edges in exact diametrical relationship, and finally securing such edges together throughout their length.

5. The method of making slip-joint pressure-retaining pipe of metal sheets, which consists in punching a plurality of accurately spaced pairs of rivet holes, the holes of each pair being located at opposite side edges of the blank, and the pairs being spaced lengthwise of the blank, and the distance between holes of a pair progressively increasing slightly from one end of the blank to the other, shaping the blank nearly cylindrically to overlap the side edges and to bring the holes of each pair into registry, securing rivets in such registering holes to prefix the opposite edges in exact diametrical relationship, forming a slightly tapered pipe section, and finally welding the overlapped edges together throughout their length.

Signed at Seattle, Washington, this 14th day of January, 1929.

CECIL R. SMITH.